(12) United States Patent
Yang

(10) Patent No.: US 11,988,801 B2
(45) Date of Patent: *May 21, 2024

(54) METHODS TO OPERATE A NUCLEAR MAGNETIC RESONANCE TOOL, METHODS TO SIMULATE A NUMERICALLY-CONTROLLED OSCILLATOR OF A NUCLEAR MAGNETIC RESONANCE TOOL IN REAL TIME, AND DOWNHOLE NUCLEAR MAGNETIC RESONANCE TOOLS

(71) Applicant: Halliburton Energy Services, Inc., Houston, TX (US)

(72) Inventor: Jie Yang, Houston, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,651

(22) Filed: Mar. 21, 2023

(65) Prior Publication Data

US 2023/0228900 A1 Jul. 20, 2023

Related U.S. Application Data

(63) Continuation of application No. 17/560,018, filed on Dec. 22, 2021, now Pat. No. 11,624,854.

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC .................................. G01V 3/32; G01V 3/38
See application file for complete search history.

(56) References Cited

U.S. PATENT DOCUMENTS

| 5,963,036 | A | 10/1999 | Wu et al. |
| 2017/0342825 | A1 | 11/2017 | Roberson |
| 2020/0049852 | A1 | 2/2020 | Wollin |

*Primary Examiner* — Gregory H Curran
(74) *Attorney, Agent, or Firm* — Barnes & Thornburg LLP

(57) ABSTRACT

Methods to operate an NMR tool, methods to simulate a numerically-controlled oscillator of an NMR tool in real time, and downhole NMR tools are presented. A method to operate an NMR tool includes determining a phase shift of a sinusoidal wave, determining a number of look-up tables and a number of terms of Taylor Expansions performed to obtain a value corresponding to a phase angle of the phase shift, and separating the phase angle into a first component and a second component. The method also includes obtaining a first value corresponding to the first component from the number of look-up tables, performing the number of terms of Taylor Expansions on the second component to obtain a second value corresponding to the second component, combining the first value and the second value to obtain the value of the phase angle, and generating the sinusoidal wave having the phase shift.

20 Claims, 4 Drawing Sheets

METHODS TO OPERATE A NUCLEAR MAGNETIC RESONANCE TOOL, METHODS TO SIMULATE A NUMERICALLY-CONTROLLED OSCILLATOR OF A NUCLEAR MAGNETIC RESONANCE TOOL IN REAL TIME, AND DOWNHOLE NUCLEAR MAGNETIC RESONANCE TOOLS

CROSS-REFERENCE TO RELATED APPLICATIONS

This application is a Continuation application of U.S. application Ser. No. 17/560,018, filed Dec. 22, 2021, which is incorporated by reference herein in its entirety.

BACKGROUND

The present disclosure relates generally to methods to operate a nuclear magnetic resonance tool, methods to simulate a numerically-controlled oscillator of a nuclear magnetic resonance tool in real time, and downhole nuclear magnetic resonance tools.

Nuclear magnetic resonance tools are sometimes deployed downhole to estimate various properties of a formation including, but not limited to, an abundance of hydrocarbon resources in the formation, abundance of other types of fluids in the formation, the material properties and composition of one or more layers of the formation, volume of the formation, as well as other properties of the formation ("formation properties"). Nuclear magnetic resonance tools typically utilize numerically-controlled oscillators to improve the signal-to-noise ratio of signals transmitted by the nuclear magnetic resonance logging tools. However, hardware components of numerically-controlled oscillators are susceptible to heat, vibrations, and other adverse downhole conditions. Further, numerically-controlled oscillators utilize additional power, which not only requires additional power source to supply such power, but also subjects the numerically-controlled oscillators and other components of the nuclear magnetic resonance tool to additional heat.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the spirit and scope of this disclosure.

Figure 1:
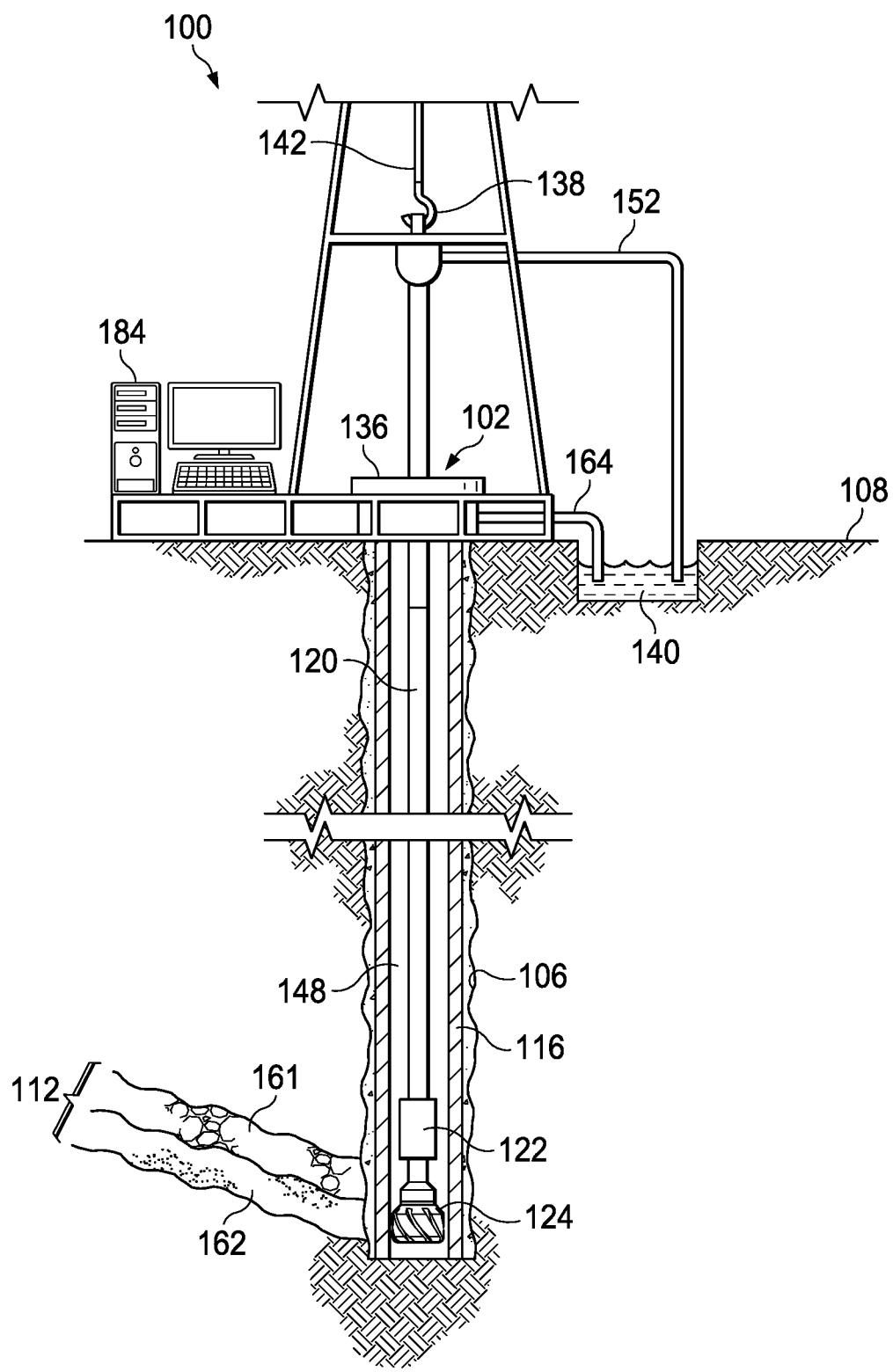
FIG. 1 illustrates a schematic view of a logging-while-drilling ("LWD") environment in which a Nuclear magnetic resonance ("NMR") tool is deployed on a tool string in an annulus of a production casing.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to methods to operate a nuclear magnetic resonance tool, methods to simulate a numerically-controlled oscillator of a nuclear magnetic resonance tool in real time, and downhole nuclear magnetic resonance tools. Moreover, the present disclosure utilizes one or more existing processors of an NMR tool to generate a software implementation of a numerically-controlled oscillator, and to generate sinusoidal waves, which are modulated with signals obtained by or generated by the NMR tool to improve the signal-to-noise ratio of the signals In some embodiments, a periodic interrupt is generated at the beginning of each iteration of operations to generate a sinusoidal wave having a desired phase shift are performed to control the timing of calculations performed during the respective iteration of operations, and timely assign values to digital-to-analog convertors (DAC), analog-to-digital convertors (ADC), and other components of the NMR tool. As referred to herein, an iteration of operations refers to a set of operations performed to generate a sinusoidal wave having a desired phase shift. In some embodiments, multiple iterations of operations are performed while the NMR tool is deployed to continuously provide sinusoidal waves having desired phase shifts for modulation with signals of the NMR tool. Additional descriptions of operations with one or more iterations of operations are provided in the paragraphs below and are illustrated in at least FIGS. 3 and 4.

Due to limitations of a combination of available memory size of a storage medium of the NMR tool, and the computing power of the processors of the NMR tool and other processors that are deployable in a downhole environment, a combination of one or more look-up tables and Taylor Expansions calculations are utilized and performed, respectively, to determine sine and cosine values of the angles of the desired phase shifts. More particularly, storage mediums that are deployable in a downhole environment have physical size and memory size constraints, and, as such, can only store one or more look-up tables that take up less than a threshold amount of memory. Similarly, processors that are deployable in a downhole environment also have physical constraints that limit the processing power and clock speed. As such, only a finite number of terms of Taylor Expansions are performed to determine the sine and cosine values of a phase angle of a phase shift before the next iteration of operations are performed, In some embodiments, the look-up tables that are stored in the storage medium of the NMR tool are layered, such that different look-up tables provide different increments of values of a phase angle. For example, a first look-up table storing 360 values that increment by 1° from 0° to 359°, and a second look-up table containing 9 values that increment by 0.1° from 0.1° to 0.9°, are stored in storage medium. In one or more of such embodiments, where the desired phase angle of a phase shift of a sine wave is 90°, the first look-up table is analyzed to determine the value of the phase angle, which is 1. In another one of such embodiments, where the desired phase angle of a phase shift of a sine wave is 90.2°, the first look-up table is accessed to determine a value of an angle provided by the first look-up table that is closest to the desired phase angle, which is 90°, and the second look-up table is accessed to determine an angle provided by the second look-up table that is closest to the difference between the desired phase angle and the angle provided by the first look-up table (90.2°–90°), which is 0.2°. The following equation is then performed to combine the value provided by the first look-up table and the value provided by the second look-up table to determine the value of the desired phase angle:

$$\sin(A+B) = \sin A \cos B + \cos A \sin B \quad \text{Equation 1}$$

where A is the value obtained by the first look-up table (sine (90°)) and B is the value obtained from the second look-up table (cos (0.2°)).

Similarly, where the desired phase angle of a phase shift of a cosine wave is 90.2° a first cosine look-up table that stores 360 values that increment by 1° from 0° to 359°, and a second cosine look-up table containing 9 values that increment by 0.1° are accessed to determine a value of an angle provided by the first cosine look-up table that is closest to the desired phase angle, which is 90°, and a value of an angle that is closest to the difference between the desired phase angle and the angle provided by the first cosine look-up table (90.2°-90°), which is 0.2°. The following equation is then performed to combine the value provided by the first cosine look-up table and the value provided by the second cosine look-up table to determine the value of the desired phase angle:

$$\cos(A+B) = \cos A \cos B - \sin A \sin B \quad \text{Equation 2}$$

In some embodiments, where three or more layered look-up tables are stored in the storage medium, three or more of the layered look-up tables are accessed, and equations 1 or 2 are performed to combine the values obtained from the look-up tables to determine a desired phase angle.

The processors also perform one or more terms of Taylor Expansions to reduce the number of look-up tables stored in the storage medium, where one or more terms of the following Taylor Expansions equations are performed to determine the desired phase angle or a component of the desired phase angle.

$$\sin(x) = x - \frac{x^3}{3!} + \frac{x^5}{5!} - \cdots \quad \text{Equation 3}$$

$$\cos(x) = 1 - \frac{x^2}{2!} + \frac{x^4}{4!} - \cdots \quad \text{Equation 4}$$

where x is the desired phase angle or component of phase angle.

Continuing with the foregoing example, where the desired phase angle of a phase shift to a sine wave is 90.22°, 90.22° is separated into a first component (90.2°) that is determined by layered look-up tables, and a second component (0.02°) that is approximately determined by performing a number of terms of Taylor Expansions. The first component and the second component are subsequently combined by applying Equation 1 (or Equation 2 if the sinusoidal wave is a cosine wave). In some embodiments, a precision threshold of the phase angle is determined, and the number of look-up tables analyzed and the number of terms of Taylor Expansions performed (e.g., one term, three terms, or another number of terms) to obtain the sine and cosine values of the phase angle that are within the precision threshold of an actual value of the phase angle are determined by the precision threshold. As referred to within, a precision threshold refers to the accuracy of a determined value from the actual value (e.g., within two decimals, within three decimals, or within another accuracy threshold). In one or more of such embodiments, the precision threshold is based on the computing power of the processors of the NMR tool. In one or more of such embodiments, the precision threshold is based on the time threshold to perform operations described herein within one iteration of operations. In one or more of such embodiments, the precision threshold is based on ADC, DAC, and/or other components of the NMR tool.

After the sine and cosine components of the phase angle are combined to obtain the sine and cosine values of the phase angle of the phase shift, a sinusoidal wave having the phase shift is generated, and is modulated with signals of the NMR tool to improve the signal-to-noise ratio of the signals. In some embodiments, where multiple iterations of the operations described herein are performed, an index is assigned to each iteration, and is incremented when the next iteration of operations are performed to determine a new phase shift. Additional details of methods to operate a nuclear magnetic resonance tool, methods to simulate a numerically-controlled oscillator of a nuclear magnetic resonance tool in real time, and downhole nuclear magnetic resonance tools are provided in the paragraphs below and are illustrated in at least FIGS. 1-4

Now turning to the figures, FIG. 1 illustrates a schematic view of a logging-while-drilling (LWD) environment 100 in which a nuclear magnetic resonance (NMR) tool 122 is deployed on a tool string 120 in an annulus of a production casing 116. FIG. 1 may also represent an MWD environment, a wireline logging environment, or another well environment where the NMR tool 122 is deployed. In the embodiment of FIG. 1, the production casing 116 extends from a surface 108 of well 102 down wellbore 106 to insulate the NMR tool 122, drill bit 124, as well as other downhole tools deployed in the production casing 116 from the surrounding subterranean formation 112, to prevent cave-ins, and/or to prevent contamination of the surrounding subterranean formation 112. In the embodiment of FIG. 1, the subterranean formation 112 is a laminated earth formation having a first layer 161 and a second layer 162. A cement sheath (not shown) is deposited along an annulus between the wellbore 106 and the production casing 116 to set the production casing 116 and to form a barrier that seals the production casing 116.

A hook 138, cable 142, traveling block (not shown), and hoist (not shown) are provided to lower the tool string 120 down the wellbore 106 or to lift the tool string 120 up from the wellbore 106. The tool string 120 may be a wireline tool string, a slickline tool string, a drill string, or another type of tool string operable to deploy the NMR tool 122. At wellhead 136, an inlet conduit 152 is coupled to a fluid source (not shown) to provide fluids, such as drilling fluids, downhole. The tool string 120 has an internal cavity that provides a fluid flow path from the surface 108, down the tool string 120, and exits the tool string 120 at the drill bit 124. The fluids flow back towards the surface 108 through a wellbore annulus 148 and exit the wellbore annulus 148 via an outlet conduit 164 where the fluids are captured in a container 140.

The NMR tool 122 includes components configured to obtain data indicative of formation properties of the subterranean formation 112. The NMR tool 122 also includes a storage medium (not shown) configured to store data indicative of the formation properties, one or more layered look-up tables, and instructions to perform operations described herein. In the embodiment of FIG. 1, the NMR tool 122 does not include a numerically-controlled oscillator hardware. Instead, the NMR tool 122 utilizes one or more processors that are configured to perform operations described herein to generate a software implementation of a numerically-controlled oscillator, and to generate sinusoidal waves having desired phase shifts in real time, where the generated sinusoidal waves are modulated with signals obtained by or generated by the NMR tool 122 to improve the signal-to-noise ratio of the signals. The modulated signals are subsequently transmitted to controller 184, which represents any electronic device configured to receive signals transmitted from the NMR tool 122.

Figure 2:
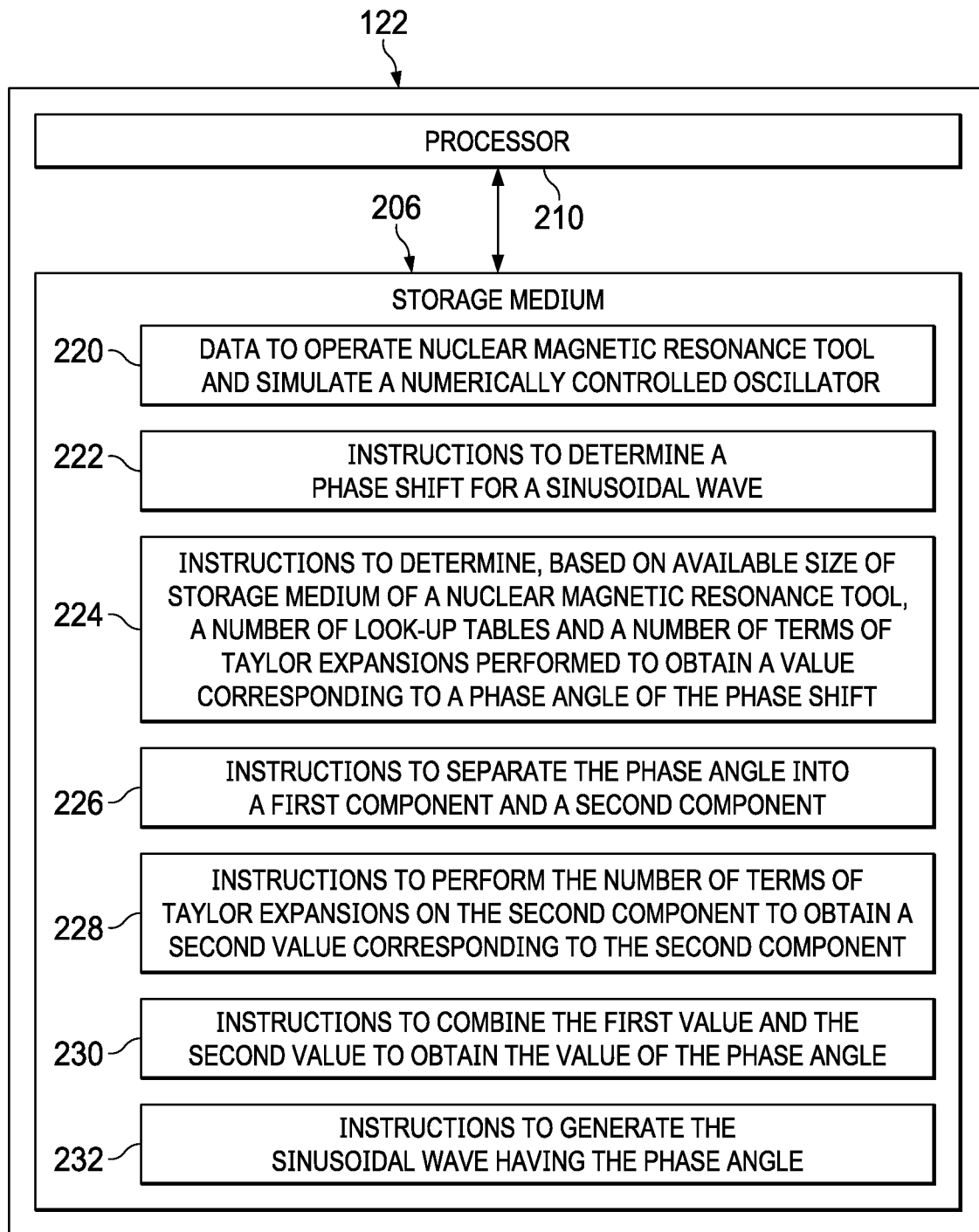
FIG. 2 illustrates a block diagram of components of the NMR tool of FIG. 1.

FIG. 2 illustrates a block diagram of components of the NMR tool 122 of FIG. 1. The NMR tool 122 includes one or more components configured to obtain data indicative of one or more properties of a formation.

The NMR tool 122 also includes a storage medium 206 and a processor 210. The storage medium 206 may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. Measurements obtained by the NMR tool 122 are stored at the storage medium 206. Moreover, data to operate the NMR tool 122 and simulate a numerically-controlled oscillator of the NMR tool 122 are stored at a first location 220 of the storage medium 206. Further, instructions to determine a phase shift for a sinusoidal wave are stored at a second location 222 of the storage medium 206. Further, instructions to determine, based on available size of storage medium of a nuclear magnetic resonance tool, a number of look-up tables and a number of terms of Taylor Expansions performed to obtain a value corresponding to a phase angle of the phase shift are stored at a third location 224 of the storage medium 206. Further, instructions to separate the phase angle into a first component and a second component are stored at a fourth location 226 of the storage medium 206. Further, instructions to perform the number of terms of Taylor Expansions on the second component to obtain a second value corresponding to the second component are stored at a fifth location 228 of the storage medium 206. Further, instructions to combine the first value and the second value to obtain the value of the phase angle are stored at a sixth location 230 of the storage medium 206. Further, instructions to generate the sinusoidal wave having the phase angle are stored at a seven location 232 of the storage medium 206. Additional instructions to perform operations described herein and other operations performed by the NMR tool 122 are also stored at different locations of the storage medium 206.

Figure 3:
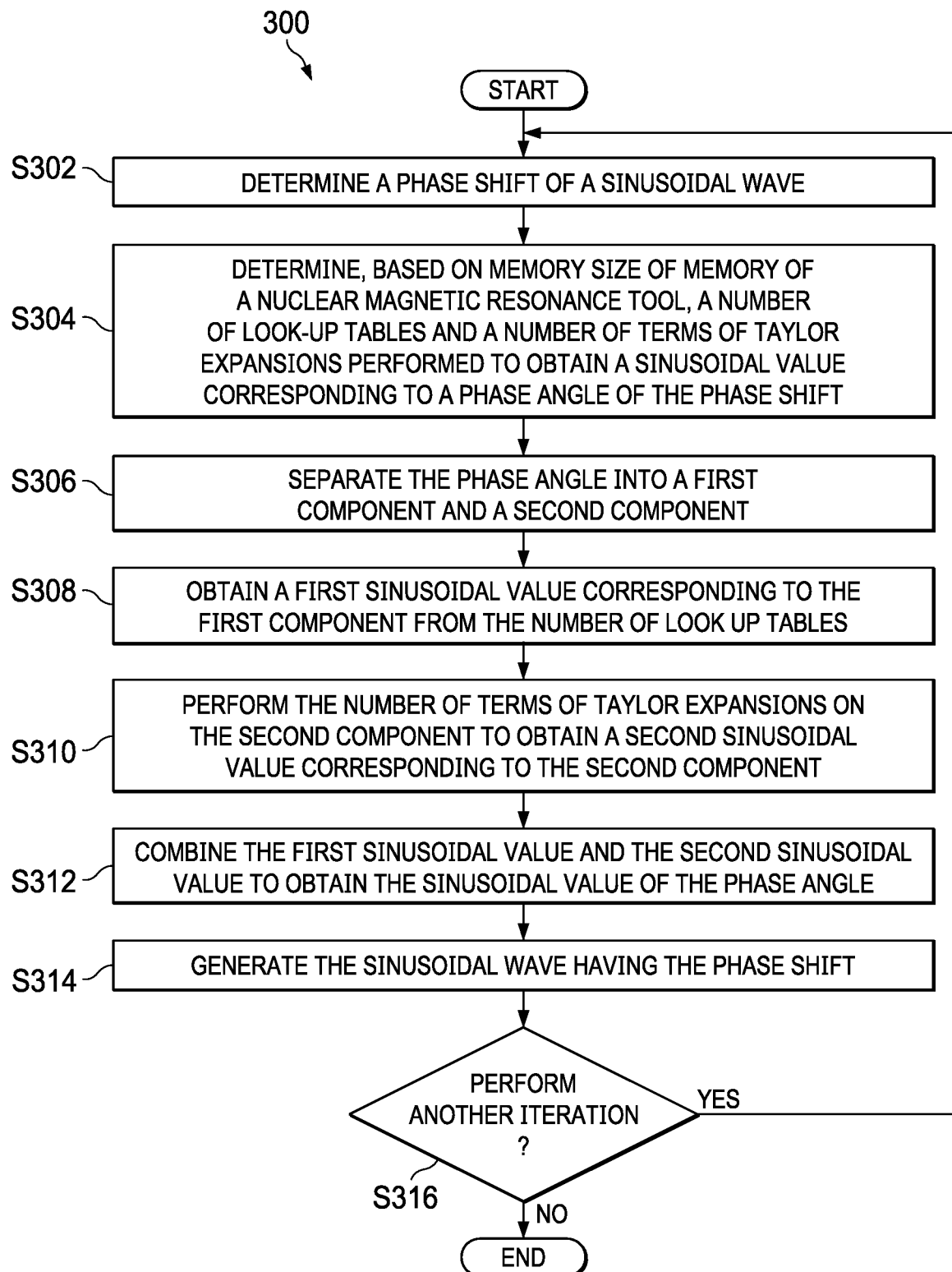
FIG. 3 illustrates a flow chart of a process to determine formation properties of the downhole formation.

FIG. 3 illustrates a flow chart of a process 300 of a method to operate a nuclear magnetic resonance tool. Although the operations in the process 300 are shown in a particular sequence, certain operations may be performed in different sequences or at the same time where feasible. Further, although the operations of the process 300 are described to be performed by the processor of the NMR tool 122 of FIG. 1, the operations may also be performed by another processor deployed downhole or by a surface-based processor.

At block S302, a phase shift of a sinusoidal wave is determined. In some embodiments, a periodic interrupt is generated at the beginning of each iteration of operations to generate a sinusoidal wave having a desired phase shift to control the timing of calculations performed during the respective iteration of operations, and timely assign values to DAC, ADC, and other components of the NMR tool.

At block S304, a number of look-up tables and a number of terms of Taylor Expansions performed to obtain a sinusoidal value (such as a sine value of a sine wave or a cosine value of a cosine wave) corresponding to a phase angle of the phase shift are determined based on memory size of memory of a nuclear magnetic resonance tool. In some embodiments, the number of look-up tables, and the number of terms of Taylor Expansions performed are based on a combination of the available memory of the storage medium, such as storage medium 206 of FIG. 2, the computing power of the processors, such as processor 210 of FIG. 2, and the precision threshold. For example, where the storage medium 206 has three-layered look-up tables, the precision threshold is met if only one of the three-layered look-up tables is accessed, then the processors will only access one look-up table and will perform zero terms of Taylor Expansions. In another example, where the storage medium 206 has two look-up tables and the precision threshold is met if both look-up tables are accessed and two terms of Taylor Expansions are performed, then the processor will access both look-up tables and perform two terms of Taylor Expansions to obtain the sinusoidal value of the phase angle.

At block S306, the phase angle is separated into a first component and a second component. For example, where the value of the phase angle is 28.3°, and the storage medium contains one look-up table that provides 180 values of angles from 0-179 in increments of 1°, the processors separate the phase angle into a first component with a value of 28°, and a second component with a value of 0.3°. At block S308, a first sinusoidal value corresponding to the first component is obtained from the number of look-up tables. Continuing with the foregoing example, the processors access the look-up table to determine the value for 28°. In some embodiments, where the storage medium contains multiple layers of look-up tables, the processors access each of the multiple layers of look-up tables to obtain corresponding values from each look-up table, then performs one or more iterations of Equations 1 or 2 to combine the values obtained from the look-up tables. In some embodiments, where the storage medium contains multiple look-up tables, the first component is subdivided into multiple subcomponents, each corresponding to a value obtained from one of the look-up tables, and Equations 1 or 2 are performed to combine the subcomponents into the first component. For example, where storage medium contains three look-up tables, the first component is sub-divided into three sub-components, each corresponding to a value obtained from one of the three look-up tables. Equations 1 or 2 are then performed two times to combine the three sub-components into the first component.

At block S310, the number of terms of Taylor Expansions on the second component are performed to obtain a second sinusoidal value corresponding to the second component. Continuing with the foregoing example, one or more terms of Taylor Expansions are performed to determine an approximate value of 0.3°. In some embodiments, the number of terms of Taylor Expansions performed is based on the precision threshold such that the least number of Taylor Expansions that would result in an approximate value that is within the precision threshold (e.g., 0.1, 0.01, 0.001 or another threshold accuracy) of the actual value are performed. For example, where the processors determine that three or more terms of Taylor Expansions generate a result that is within the precision threshold of an actual value of the second component, then the processors perform three terms of Taylor Expansions to obtain an approximate value of the second component. At block S312, the first sinusoidal value and the second sinusoidal value are combined to obtain the sinusoidal value of the phase angle. Continuing with the foregoing example, Equations 1 or 2 are performed to combine 28° and 0.3° to obtain the value for 28.3°. In another example, where the storage medium 206 has two look-up tables and the precision threshold is met if both look-up tables are accessed and two terms of Taylor Expansions are performed, then the desired phase angle (72.4°) is divided into a first component (70°) and a second component (2°) to be determined by accessing the look-up tables, and a third component (0.4°) to be determined by performing two terms of Taylor Expansions. The first component and the second component are then combined by applying Equation 1 or Equation 2, and the result is then combined with the third component by applying Equation 1 or Equation 2 to obtain the value of the phase angle.

At block S314, the sinusoidal wave having the phase shift is generated. In the embodiment of FIG. 3, processor 210 of FIG. 2 generates a sine or cosine wave having the desired phase shift, which is modulated with signals obtained by or generated by the NMR tool to improve the signal-to-noise ratio of the signals. In some embodiments, processor 210 modulates signals indicative of data obtained by NMR tool 122 of FIG. 1 with the generated sinusoidal wave having the phase shift to improve the signal-to-noise ratio of the signals. In some embodiments, the modulated signals are then transmitted uphole, such as to controller 184 of FIG. 1. The operations described at blocks S302, S304, S306, S308, S310, S312, and S314 are performed within a threshold period of time and are completed before another phase shift on a sinusoidal wave is implemented.

At block S316, a determination is made whether to perform the operations at blocks S302, S304, S306, S308, S310, S312, and S314 for another iteration. In some embodiments, where the NMR tool operates for a period of time, additional iterations of operations performed at blocks S302, S304, S306, S308, S310, S312, and S314 are performed to generate additional sinusoidal waves having desired phase shifts for modulation with signals of the NMR to improve the signal-to-noise ratio of the signals. In such embodiments, operations performed at each iteration are performed within a threshold period of time and are completed before another phase shift on a sinusoidal wave is implemented. In some embodiments, an index value is indicative of a current iteration (e.g., $1^{st}$ iteration, $10^{th}$ iteration, $100^{th}$ iteration, etc.) is assigned to each iteration of the operations, and is incremented (e.g., $2^{nd}$ iteration, $11^{th}$ iteration, $101^{st}$ iterations, etc.) each time a new iteration of the operations is performed and a new phase shift is determined. Alternatively, the process returns to block S302 if a determination is made to perform the foregoing operations for another iteration. Alternatively, the process ends if a determination is made not to perform the foregoing operations for another iteration.

Figure 4:
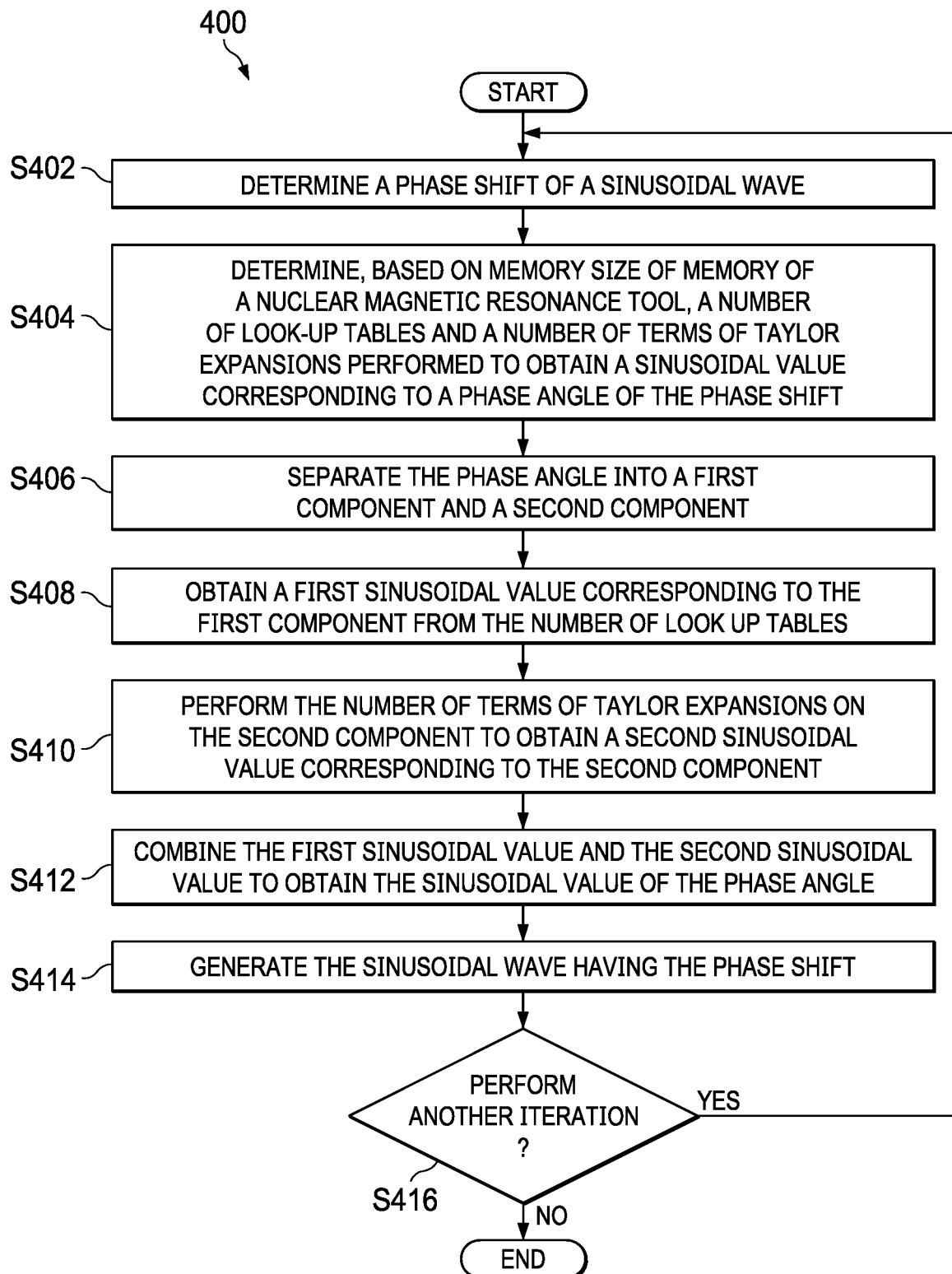
FIG. 4 illustrates a flow chart of a process to simulate a numerically-controlled oscillator of a nuclear magnetic resonance tool in real time.

FIG. 4 illustrates a flow chart of a process 400 of a method to simulate a numerically-controlled oscillator of a nuclear magnetic resonance tool in real time. Although the operations in the process 400 are shown in a particular sequence, certain operations may be performed in different sequences or at the same time where feasible. Further, although the operations of the process 400 are described to be performed by the processor 210 of the NMR tool 122 in FIG. 1, the operations may also be performed by another processor deployed downhole or by a surface-based processor.

At block S402, a phase shift of a sinusoidal wave is determined. At block S404, a number of look-up tables and a number of terms of Taylor Expansions performed to obtain a sinusoidal value corresponding to a phase angle of the phase shift are determined based on memory size of memory of a nuclear magnetic resonance tool. At block S406, the phase angle is separated into a first component and a second component. At block S408, a first sinusoidal value corresponding to the first component is obtained from the number of look-up tables. At block S410, the number of terms of Taylor Expansions on the second component are performed to obtain a second sinusoidal value corresponding to the second component. At block S412, the first sinusoidal value and the second sinusoidal value are combined to obtain the sinusoidal value of the phase angle. At block S414, the sinusoidal wave having the phase shift is generated. At block S416, a determination is made whether to perform the operations at blocks S402, S404, S406, S408, S410, S412, and S414 for another iteration. Operations performed at blocks S402, S404, S406, S408, S410, S412, S414, and S416 are similar or identical to the operations performed at blocks S302, S304, S306, S308, S310, S312, S314, and S316, and described herein.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, a method to operate a nuclear magnetic resonance tool, the method comprising: determining a phase shift of a sinusoidal wave; determining, based on memory size of memory of a nuclear magnetic resonance tool, a number of look-up tables and a number of terms of Taylor Expansions performed to obtain a sinusoidal value corresponding to a phase angle of the phase shift; separating the phase angle into a first component and a second component; obtaining a first sinusoidal value corresponding to the first component from the number of look-up tables; performing the number of terms of Taylor Expansions on the second component to obtain a second sinusoidal value corresponding to the second component; combining the first sinusoidal value and the second sinusoidal value to obtain the sinusoidal value of the phase angle; and generating the sinusoidal wave having the phase shift.

Clause 2, the method of clause 1, further comprising determining, based on a computing power of a downhole processor of the nuclear magnetic resonance tool, the number of look-up tables and the number of terms of Taylor Expansions performed to generate the phase angle.

Clause 3, the method of clauses 1 or 2, further comprising: determining a precision threshold of the phased angle; and determining, based on the precision threshold, the number of look-up tables and the number of terms of Taylor Expansions performed to obtain the sinusoidal value of the phase angle that is within the precision threshold of an actual value of the phase angle.

Clause 4, the method of clause 3, further comprising determining a computing power of a downhole processor of the nuclear magnetic resonance tool, wherein determining the precision threshold of the phase angle comprises determining the precision threshold based on the computing power of the downhole processor of the nuclear magnetic resonance tool.

Clause 5, the method of any of clauses 1-4, wherein the sinusoidal wave is generated in real time, and wherein determining the phase shift for a sinusoidal wave, determining the number of look-up tables and the number of terms of Taylor Expansions performed to obtain a sinusoidal value corresponding to the phase angle of the phase shift, separating the phase angle into the first component and the second component, obtaining the first sinusoidal value corresponding to the first component from the look-up table, performing the number of terms of Taylor Expansions on the second component to obtain the second sinusoidal value corresponding to the second component, combining the first sinusoidal value and the second sinusoidal value to obtain the sinusoidal value of the phase angle, and generating the sinusoidal wave having the phase shift are performed within a threshold period of time.

Clause 6, the method of clause 5, further comprising determining the phase shift for a sinusoidal wave, determining the number of look-up tables and the number of terms of Taylor Expansions performed to obtain a sinusoidal value corresponding to the phase angle of the phase shift, separating the phase angle into the first component and the second component, obtaining the first sinusoidal value corresponding to the first component from the look-up table, performing the number of terms of Taylor Expansions on the second component to obtain the second sinusoidal value corresponding to the second component, combining the first sinusoidal value and the second sinusoidal value to obtain the sinusoidal value of the phase angle, and generating the sinusoidal wave having the phase shift for a threshold number of iterations, wherein each iteration of the threshold of iterations is performed within a threshold period of time.

Clause 7, the method of clause 6, further comprising generating a periodic interrupt for each iteration to control timing to obtain the sinusoidal value of the phase angle.

Clause 8, the method of any of clauses 1-7, wherein the number of look-up tables is one, and wherein obtaining the first sinusoidal value corresponding to the first component comprises obtaining the first sinusoidal value from the look-up table.

Clause 9, the method of any of clauses 1-7, wherein the number of look-up tables is two, and wherein obtaining the first sinusoidal value corresponding to the first component further comprises: obtaining a third sinusoidal value corresponding to the first component from a first look-up table; obtaining a fourth sinusoidal value corresponding to the first component from a second look-up table; and combining the third sinusoidal value and the fourth sinusoidal value to obtain the first sinusoidal value.

Clause 10, the method of any of clauses 1-7, wherein the number of look-up tables is three, and wherein obtaining the first sinusoidal value corresponding to the first component further comprises obtaining a fifth sinusoidal value corresponding to the first component from a third look-up table, wherein combining the third sinusoidal value and the fourth sinusoidal value further comprises combining the third sinusoidal value, the fourth sinusoidal value, and the fifth sinusoidal value to obtain the first sinusoidal value.

Clause 11, the method of any of clauses 1-10, further comprising: assigning an index value indicative of a current iteration of the phase shift; and incrementing the index value each time a new iteration of the phase shift is determined.

Clause 12, the method of any of clauses 1-11, further comprising modulating a signal obtained by the nuclear magnetic resonance tool with the sinusoidal wave having the phase shift.

Clause 13, a method to simulate a numerically-controlled oscillator of a nuclear magnetic resonance tool in real time, the method comprising: for each iteration of a threshold of iterations: determining a phase shift for a sinusoidal wave; determining, based on memory size of memory of a nuclear magnetic resonance tool, a number of look-up tables and a number of terms of Taylor Expansions performed to obtain a sinusoidal value corresponding to a phase angle of the phase shift; separating the phase angle into a first component and a second component; obtaining a first sinusoidal value corresponding to the first component from the number of look-up tables; performing the number of terms of Taylor Expansions on the second component to obtain a second sinusoidal value corresponding to the second component; combining the first sinusoidal value and the second sinusoidal value to obtain the sinusoidal value of the phase angle; and generating the sinusoidal wave having the phase shift.

Clause 14, the method of clause 13, wherein each iteration of the threshold of iterations is performed within a threshold period of time.

Clause 15, the method of clause 14, further comprising determining, based on a computing power of a downhole processor of the nuclear magnetic resonance tool, the number of look-up tables and the number of terms of Taylor Expansions performed to generate the phase angle.

Clause 16, the method of clauses 14 or 15, further comprising: determining a precision threshold of the phased angle; and determining, based on the precision threshold, the number of look-up tables and the number of terms of Taylor Expansions performed to obtain the sinusoidal value of the phase angle that is within the precision threshold of an actual value of the phase angle.

Clause 17, the method of any of clauses 13-16, further comprising generating a periodic interrupt for each iteration to control timing to obtain the sinusoidal value of the phase angle.

Clause 18, the method of any of clauses 13-17, further comprising providing the sinusoidal wave having the phase shift for modulation with a signal obtained by the magnetic resonance tool.

Clause 19, a downhole nuclear magnetic resonance tool, comprising: one or more components configured to obtain data indicative of one or more properties of a formation; a storage medium; and a processor configured to: determine a phase shift for a sinusoidal wave; determine, based on available size of storage medium of a nuclear magnetic resonance tool, a number of look-up tables and a number of terms of Taylor Expansions performed to obtain a sinusoidal value corresponding to a phase angle of the phase shift; separate the phase angle into a first component and a second component; obtain a first sinusoidal value corresponding to the first component from the number of look-up tables; perform the number of terms of Taylor Expansions on the second component to obtain a second sinusoidal value corresponding to the second component; combine the first sinusoidal value and the second sinusoidal value to obtain the sinusoidal value of the phase angle; generate the sinusoidal wave having the phase angle; and modulate signals indicative of the data with the sinusoidal wave having the phase shift to improve a signal-to-noise ratio of the signals.

Clause 20, the downhole nuclear magnetic resonance tool of clause 19, wherein the processor is further configured to determine, based on computing power of the processor and the precision threshold of the phase angle, the number of look-up tables and the number of terms of Taylor Expansions performed to obtain the sinusoidal value corresponding to the phase angle.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. A method to operate a nuclear magnetic resonance tool, the method comprising:
   determining a phase shift of a sinusoidal wave;
   determining, based on memory size of memory of a nuclear magnetic resonance tool, a number of terms of Taylor Expansions performed to obtain a sinusoidal value corresponding to a phase angle of the phase shift;
   separating the phase angle into a first component and a second component;
   obtaining a first sinusoidal value corresponding to the first component;
   performing the number of terms of Taylor Expansions on the second component to obtain a second sinusoidal value corresponding to the second component;
   combining the first sinusoidal value and the second sinusoidal value to obtain the sinusoidal value of the phase angle; and
   generating the sinusoidal wave having the phase shift.

2. The method of claim 1, further comprising determining, based on a computing power of a downhole processor of the nuclear magnetic resonance tool, the number of terms of Taylor Expansions performed to generate the phase angle.

3. The method of claim 1, further comprising:
   determining a precision threshold of the phased angle; and
   determining, based on the precision threshold, the number of terms of Taylor Expansions performed to obtain the sinusoidal value of the phase angle that is within the precision threshold of an actual value of the phase angle.

4. The method of claim 3, further comprising determining a computing power of a downhole processor of the nuclear magnetic resonance tool, wherein determining the precision threshold of the phase angle comprises determining the precision threshold based on the computing power of the downhole processor of the nuclear magnetic resonance tool.

5. The method of claim 1, wherein the sinusoidal wave is generated in real time, and wherein determining the phase shift for a sinusoidal wave, determining number of terms of Taylor Expansions performed to obtain a sinusoidal value corresponding to the phase angle of the phase shift, separating the phase angle into the first component and the second component, obtaining the first sinusoidal value corresponding to the first component, performing the number of terms of Taylor Expansions on the second component to obtain the second sinusoidal value corresponding to the second component, combining the first sinusoidal value and the second sinusoidal value to obtain the sinusoidal value of the phase angle, and generating the sinusoidal wave having the phase shift are performed within a threshold period of time.

6. The method of claim 5, further comprising determining the phase shift for a sinusoidal wave, determining the number of terms of Taylor Expansions performed to obtain a sinusoidal value corresponding to the phase angle of the phase shift, separating the phase angle into the first component and the second component, obtaining the first sinusoidal value corresponding to the first component, performing the number of terms of Taylor Expansions on the second component to obtain the second sinusoidal value corresponding to the second component, combining the first sinusoidal value and the second sinusoidal value to obtain the sinusoidal value of the phase angle, and generating the sinusoidal wave having the phase shift for a threshold number of iterations, wherein each iteration of the threshold of iterations is performed within a threshold period of time.

7. The method of claim 6, further comprising generating a periodic interrupt for each iteration to control timing to obtain the sinusoidal value of the phase angle.

8. The method of claim 1, wherein obtaining the first sinusoidal value corresponding to the first component comprises obtaining the first sinusoidal value from a look-up table.

9. The method of claim 1, wherein obtaining the first sinusoidal value corresponding to the first component further comprises:
   obtaining a third sinusoidal value corresponding to the first component from a first look-up table;
   obtaining a fourth sinusoidal value corresponding to the first component from a second look-up table; and
   combining the third sinusoidal value and the fourth sinusoidal value to obtain the first sinusoidal value.

10. The method of claim 1, wherein obtaining the first sinusoidal value corresponding to the first component further comprises obtaining a fifth sinusoidal value corresponding to the first component from a third look-up table, wherein combining the third sinusoidal value and the fourth sinusoidal value further comprises combining the third sinusoidal value, the fourth sinusoidal value, and the fifth sinusoidal value to obtain the first sinusoidal value.

11. The method of claim 1, further comprising:
   assigning an index value indicative of a current iteration of the phase shift; and
   incrementing the index value each time a new iteration of the phase shift is determined.

12. The method of claim 1, further comprising modulating a signal obtained by the nuclear magnetic resonance tool with the sinusoidal wave having the phase shift.

13. A method to simulate a numerically-controlled oscillator of a nuclear magnetic resonance tool in real time, the method comprising:
   for each iteration of a threshold of iterations:
      determining a phase shift for a sinusoidal wave;
      determining, based on memory size of memory of a nuclear magnetic resonance tool, a number of terms of Taylor Expansions performed to obtain a sinusoidal value corresponding to a phase angle of the phase shift;

separating the phase angle into a first component and a second component;

obtaining a first sinusoidal value corresponding to the first component;

performing the number of terms of Taylor Expansions on the second component to obtain a second sinusoidal value corresponding to the second component;

combining the first sinusoidal value and the second sinusoidal value to obtain the sinusoidal value of the phase angle; and generating the sinusoidal wave having the phase shift.

14. The method of claim 13, wherein each iteration of the threshold of iterations is performed within a threshold period of time.

15. The method of claim 14, further comprising determining, based on a computing power of a downhole processor of the nuclear magnetic resonance tool, the number of terms of Taylor Expansions performed to generate the phase angle.

16. The method of claim 14, further comprising:
determining a precision threshold of the phased angle; and
determining, based on the precision threshold, the number of terms of Taylor Expansions performed to obtain the sinusoidal value of the phase angle that is within the precision threshold of an actual value of the phase angle.

17. The method of claim 13, further comprising generating a periodic interrupt for each iteration to control timing to obtain the sinusoidal value of the phase angle.

18. The method of claim 13, further comprising providing the sinusoidal wave having the phase shift for modulation with a signal obtained by the magnetic resonance tool.

19. A downhole nuclear magnetic resonance tool, comprising:

one or more components configured to obtain data indicative of one or more properties of a formation;

a storage medium; and a processor configured to:
determine a phase shift for a sinusoidal wave;

determine, based on available size of storage medium of a nuclear magnetic resonance tool, a number of terms of Taylor Expansions performed to obtain a sinusoidal value corresponding to a phase angle of the phase shift;

separate the phase angle into a first component and a second component;

obtain a first sinusoidal value corresponding to the first component;

perform the number of terms of Taylor Expansions on the second component to obtain a second sinusoidal value corresponding to the second component;

combine the first sinusoidal value and the second sinusoidal value to obtain the sinusoidal value of the phase angle;

generate the sinusoidal wave having the phase angle; and modulate signals indicative of the data with the sinusoidal wave having the phase shift to improve a signal-to-noise ratio of the signals.

20. The downhole nuclear magnetic resonance tool of claim 19, wherein the processor is further configured to determine, based on computing power of the processor and the precision threshold of the phase angle, the number of terms of Taylor Expansions performed to obtain the sinusoidal value corresponding to the phase angle.

* * * * *